United States Patent
Best et al.

(10) Patent No.: US 10,450,142 B1
(45) Date of Patent: Oct. 22, 2019

(54) CONVEYOR CARRIER CART

(71) Applicant: Intelligrated Headquarters, LLC, Mason, OH (US)

(72) Inventors: Richmond Emory Best, Mount Airy, MD (US); John Mertz, Mason, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/963,666

(22) Filed: Apr. 26, 2018

(51) Int. Cl.
*B65G 17/34* (2006.01)
*B65G 47/40* (2006.01)
*B65G 47/96* (2006.01)
*B65G 17/18* (2006.01)

(52) U.S. Cl.
CPC ............ *B65G 17/34* (2013.01); *B65G 17/18* (2013.01); *B65G 47/40* (2013.01); *B65G 47/96* (2013.01)

(58) Field of Classification Search
CPC ........ B65G 17/16; B65G 17/18; B65G 17/34; B65G 17/345; B65G 17/36; B65G 17/365; B65G 17/42; B65G 17/44; B65G 47/40; B65G 47/94; B65G 47/945; B65G 47/96
USPC .......................................... 198/370.01–370.1
See application file for complete search history.

(56) References Cited

U.S. PATENT DOCUMENTS

| | | | | |
|---|---|---|---|---|
| 2,609,086 A * | 9/1952 | McBride | ............... | B65G 17/34 198/698 |
| 3,590,745 A * | 7/1971 | Ouska | ................. | B65G 17/065 104/172.3 |
| 3,669,245 A * | 6/1972 | Wooten | ............... | B65G 47/962 198/370.04 |
| 4,787,498 A * | 11/1988 | Males | ................. | B65G 47/962 198/370.04 |
| 5,632,589 A * | 5/1997 | Bray | ...................... | B61B 13/04 198/349.6 |
| 6,253,901 B1 * | 7/2001 | Hintz | .................. | B65G 17/345 198/370.06 |
| 6,899,217 B1 | 5/2005 | Fortenbery et al. | | |
| 8,985,310 B2 * | 3/2015 | Heitplatz | ............. | B65G 17/066 198/370.04 |
| 10,202,245 B1 * | 2/2019 | Fujio | ................... | B65G 17/345 |

(Continued)

FOREIGN PATENT DOCUMENTS

EP    3 159 288 A1    4/2017

*Primary Examiner* — Mark A Dueble
(74) *Attorney, Agent, or Firm* — Alston & Bird LLP

(57) ABSTRACT

The present disclosure relates to a conveyor carrier cart. The conveyor carrier cart includes a main body, a pair of pivoting arms, and a folding mechanism. The main body defines a load carrying surface to support one or more objects disposed thereon. The pair of pivoting arms include a proximal end and a distal end. The proximal end pivotally connects each pivoting arm with the main body through the folding mechanism and the distal end connects with a guide member of a conveyor assembly. Each pivoting arm is configured to pivot between a deployed position and a retracted position. In the deployed position, the distal end of each pivoting arm engages the guide member of the conveyor assembly. In the retracted position, the distal end of each pivoting arm pivots about the folding mechanism to disengage from the guide member of the conveyor assembly.

20 Claims, 4 Drawing Sheets

(56) References Cited

U.S. PATENT DOCUMENTS

| | | | |
|---|---|---|---|
| 2003/0183482 A1* | 10/2003 | Boller | B65G 47/962 |
| | | | 198/370.04 |
| 2005/0167241 A1* | 8/2005 | Hishinuma | B65G 17/345 |
| | | | 198/370.06 |
| 2007/0029166 A1* | 2/2007 | Lim | B65G 17/066 |
| | | | 198/370.04 |
| 2011/0108388 A1* | 5/2011 | Van Den Goon | B65G 17/066 |
| | | | 198/370.02 |
| 2013/0084150 A1 | 4/2013 | Heitplatz | |
| 2013/0248323 A1* | 9/2013 | Sotelo | B65G 17/12 |
| | | | 198/370.04 |

* cited by examiner

CONVEYOR CARRIER CART

TECHNICAL FIELD

The present disclosure relates in general to material handling systems, and, more specifically, to conveyor carrier carts employed in material handling systems.

BACKGROUND

Conventional conveyor systems and assemblies may include multiple conveyor carrier carts that are often used for supporting and transporting objects in industrial and manufacturing contexts. An example conveyor assembly may include a sorter conveyor system, a merge conveyor system, an accumulation conveyor system, an induction conveyor system, a loop sorter system, or the like. These conveyor assemblies often use conveyor carrier carts formed as rigid, immovable structures that are assembled during manufacturing of the conveyor systems.

Due to the integral nature of conventional conveyor systems, replacement and/or repair of the conveyor carrier carts as well as other conveyor assembly components may be impeded. In particular, traditional conveyor carrier carts are often difficult to extract from conveyor sections due to their rigid geometry and often require disassembly of the conveyor systems. Such a disassembly process may be expensive, time consuming, and impact the operating efficiency of the conveyor systems. Applicant has identified a number of deficiencies and problems associated with conventional conveyor assemblies and other associated systems and methods. Through applied effort, ingenuity, and innovation, many of these identified problems have been solved by developing solutions that are included in embodiments of the present disclosure, many examples of which are described in detail herein.

BRIEF SUMMARY

The following presents a simplified summary in order to provide a basic understanding of some aspects of the disclosed conveyor carrier cart. This summary is not an extensive overview and is intended to neither identify key or critical elements nor delineate the scope of such elements. Its purpose is to present some concepts of the described features in a simplified form as a prelude to the more detailed description that is presented later.

Various aspects described herein relate to a conveyor carrier cart including a main body (e.g., frame), a pair of pivoting arms, and a folding mechanism. The main frame defines a load carrying surface configured to support one or more objects disposed thereon. Each of the pair of pivoting arms includes a proximal end and a distal end. The proximal end pivotally connects each pivoting arm with the main frame via the folding mechanism and the distal end connects with a guide member of a conveyor assembly. Each pivoting arm is configured to pivot between a deployed position and a retracted position. In the deployed position, the distal end of each pivoting arm is configured to engage the guide member of the conveyor assembly such that the conveyor carrier cart is movable along the conveyor assembly. In the retracted position, the distal end of each pivoting arm may pivot about the folding mechanism to disengage from the guide member of the conveyor assembly such that the conveyor carrier cart is removable from the conveyor assembly. By allowing each pivoting arm of the conveyor carrier cart to pivot between the deployed position and the retracted position, replacement, repair, storage, and shipment of the conveyor carrier cart is greatly improved and shipping costs and storage space are reduced.

Various aspects described herein also relate to a conveyor carrier cart including a locking mechanism configured to secure each pivoting arm in the deployed position.

Various aspects described herein also relate to a conveyor carrier cart including one or more pivoting arms, wherein each pivoting arm, when in the retracted position, is disposed adjacent a bottom surface of the main body, wherein the bottom surface is opposite the load carrying surface.

Various aspects described herein also relate to a conveyor carrier cart including one or more rotatable guide wheels located at the distal end of each pivoting arm.

Various aspects described herein also relate to a conveyor carrier cart having a main frame that includes a first surface, a second surface, a third surface opposite the second surface, and a fourth surface, wherein the first surface is a top surface of the conveyor carrier cart, the fourth surface is a bottom surface of the conveyor carrier cart, and the second surface and the third surface form a left and a right side surfaces of the conveyor carrier cart, respectively.

Various aspects described herein also relate to a conveyor carrier cart having pivoting arms coupled to the second surface and the third surface respectively via the locking mechanism and the fourth surface via the folding mechanism.

Various aspects described herein also relate to a conveyor carrier cart wherein the folding mechanism includes a pivot pin, a set of apertures, and a hinge block, wherein the set of apertures in combination with the pivot pin and the hinge block facilitate pivotal movement of each of the pivoting arms between the deployed position and the retracted position.

Various aspects described herein also relate to a conveyor carrier cart wherein the folding mechanism rotates each pivoting arm in an inward direction until each of the pivoting arms are located substantially parallel with respect to one another, wherein each pivoting arm is subjected to a radial rotation from an initial position 'x' to a final position 'y'. The pivot pin is operable to fold each of the pivoting arms about the folding pivot axis in the closed loop path defined by the x-y positions, below the main frame of the conveyor carrier cart.

Various aspects described herein also relate to a conveyor carrier cart including a locking mechanism that includes attaching bolts, washer plates, or snap fit locks with push buttons.

Various aspects described herein also relate to a conveyor carrier cart movable between a deployed position and a retracted position. In the deployed position, the distal end of each of the pivoting arms are spread outwardly away from the main frame and remain substantially parallel with respect to the main frame, and, in the retracted position, the distal end of each of the pivoting arms are folded towards the main frame and remain substantially perpendicular with respect to the main frame.

Various aspects described herein also relate to a conveyor carrier cart that includes a second pair of pivoting arms. The second pair of pivoting arms may define a proximal end configured to connect each of the second pair of pivoting arms with the main frame, and a distal end configured to engage the corresponding guide member of the conveyor assembly. The conveyor carrier cart may include a second folding mechanism configured to pivotally connect the proximal end of each of the second pair of pivoting arms to the main frame. Each of the second pair of pivoting arms may pivot about the second folding mechanism between a deployed position and a retracted position. In the deployed position, the distal end of each of the second pair of pivoting arms may engage the corresponding guide member of the conveyor assembly such that the conveyor carrier cart is movable along the conveyor assembly. In the retracted position, the distal end of each of the second pair of pivoting arms pivots about the second folding mechanism to disengage from the corresponding guide member of the conveyor assembly such that the conveyor carrier cart is removable from the conveyor assembly.

Various aspects described herein relate to a conveyor carrier cart including a locking mechanism with a push button that is operated to selectively release the snap fit lock such that each of the second pair of pivoting arms are released to the retracted position.

Various aspects described herein also relate to a conveyor carrier cart including a conductor plate comprising a plate section and a bracket section. In such an embodiment, the bracket section and the plate section may include a Y-shaped cross section.

Various aspects described herein also relate to a material handling system including a conveyor assembly. The conveyor assembly includes a conveyor bed to moveably support one or more conveyor carrier carts. The conveyor carrier carts may include one or more corresponding guide members. Each conveyor carrier cart may include a main body, a pair of pivoting arms, and a folding mechanism. The main frame defines a load carrying surface to support one or more objects disposed thereon. The pair of pivoting arms each include a proximal end and a distal end. The proximal end pivotally connects each pivoting arm with the main body through the folding mechanism and the distal end connects with a guide member of a conveyor assembly. Each pivoting arm is configured to pivot between a deployed position and a retracted position. In the deployed position, the distal end of each pivoting arm is configured to engage the guide member of the conveyor assembly such that the conveyor carrier cart is movable along the conveyor assembly. In the retracted position, the distal end of each pivoting arm may pivot about the folding mechanism to disengage from the guide member of the conveyor assembly such that the conveyor carrier cart is removable from the conveyor assembly. By allowing each pivoting arm of the conveyor carrier cart to pivot between the deployed position and the retracted position, replacement, repair, storage, and shipment of the conveyor carrier cart is greatly improved and shipping costs and storage space are reduced.

Various aspects described herein also relate to a material handling system including the carrier cart with one or more pivoting arms. The distal end of each pivoting arm includes one or more rotatable guide wheels located at the distal end of each pivoting arm.

Various aspects described herein also relate to a material handling system including the carrier cart with one or more pivoting arms. Each pivoting arm, when in the retracted position, is disposed adjacent a bottom surface of the main body, wherein the bottom surface is opposite the load carrying surface.

Various aspects described herein also relate to a material handling system including the carrier cart having a locking mechanism configured to secure each pivoting arm in the deployed position.

Various aspects described herein also relate to a method for operating a material handling system. The method includes providing a conveyor assembly having a conveyor bed movably supporting conveyor carrier carts with one or more corresponding guide members. The method further includes providing a conveyor carrier cart including a main body, a pair of pivoting arms and a folding mechanism. The main body defines a load carrying surface to support one or more objects disposed thereon. The pair of pivoting arms includes a proximal end and a distal end. The proximal end pivotally connects each pivoting arm with the main body through the folding mechanism and the distal end connects with a guide member of a conveyor assembly. Each pivoting arm is configured to pivot between a deployed position and a retracted position. The method further includes pivoting each pivoting arm of the conveyor carrier cart into the deployed position such that the conveyor carrier cart is movable along the conveyor assembly and pivoting each pivoting arm of the conveyor carrier cart into a retracted position such that the conveyor carrier cart is removable from the conveyor assembly. By allowing each pivoting arm of the conveyor carrier cart to pivot between the deployed position and the retracted position, replacement, repair storage and shipment of the conveyor carrier cart is greatly facilitated, simplifying the conveyor carrier cart repair and replacement, as well as reducing shipping costs and storage space.

Various aspects described herein also relate to a method for operating a material handling system. The method includes engaging the distal end of each pivoting arm to a corresponding guide member of the conveyor assembly when in the deployed position.

Various aspects described herein also relate to a method for operating a material handling system. The method includes disengaging the distal end of each pivoting arm from the corresponding guide member of the conveyor assembly when in the retracted position.

Various aspects described herein also relate to a method for operating a material handling system. The method includes providing one or more rotatable guide wheels at the distal end of each pivoting arm.

Various aspects described herein also relate to a method for operating a material handling system. The method includes locking each pivoting arm in the deployed position with a locking mechanism.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
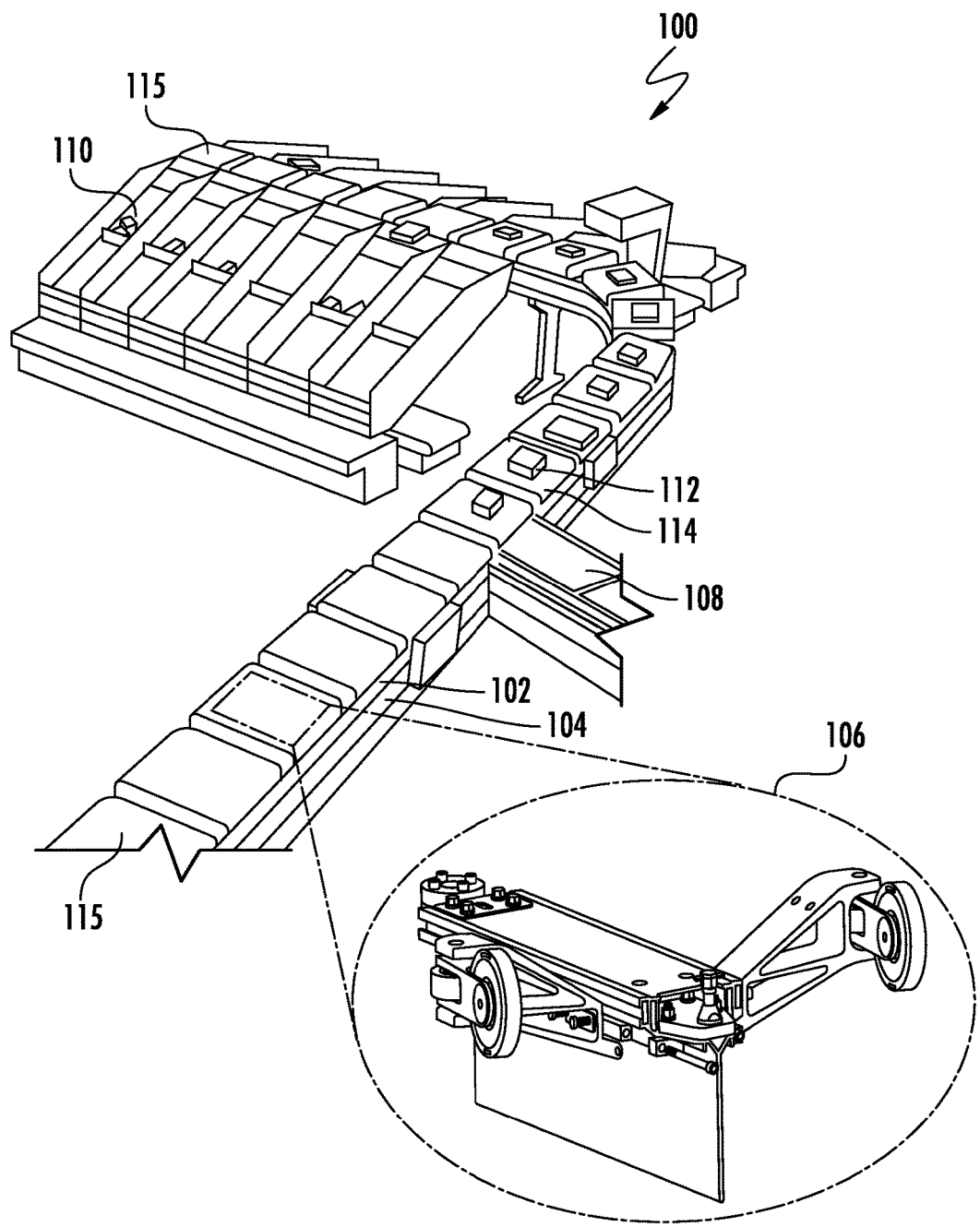
FIG. 1 illustrates a perspective view of a material handling system including multiple conveyor carrier carts, in accordance with one or more embodiments of the present disclosure.

The present disclosure relates to a material handling system that includes a conveyor assembly supporting one or more conveyor carrier carts. Each conveyor carrier cart may be configured to be removable from the conveyor assembly. Each conveyor carrier cart may be removable by retracting one or more pivoting arms of each conveyor carrier cart that engage with one or more guide members of the conveyor assembly. When retracting the one or more pivoting arms, the conveyor carrier cart may be transformed from a deployed position to a retracted position. The transformation may be accomplished via the pivotal movement of each pivoting arm with respect to a main body of the conveyor carrier cart. Further, each conveyor carrier cart may include a folding mechanism and a locking mechanism. The folding mechanism may be configured to pivotally connect the proximal end of each pivoting arm to the main body. Each pivoting arm may be configured to pivot about the folding mechanism between the deployed position and the retracted position. The locking mechanism may be configured to secure each pivoting arm in the deployed position.

In some embodiments, when the conveyor carrier cart is removed from the conveyor assembly, the folding mechanism rotates each pivoting arm in an inward direction until each of the pivoting arms are located substantially parallel with respect to one another. For example, each pivoting arm undergoes a radial rotation from an initial position 'x' to a final position 'y'. The initial position 'x' corresponding to the deployed position and the final position 'y' corresponding to the retracted position. Therefore, each of the pivoting arm traces a closed path in an inward direction defined by the initial position 'x' and the final position 'y'. Each of the pivoting arms at the final position 'y' are substantially parallel with respect to one another.

The folding mechanism may be operable to fold the pair of pivoting arms. In this regard, the folding mechanism is operable to fold each of the pivoting arms about a folding pivot axis in the closed path defined by x-y positions, below the main body (e.g., frame) of the conveyor carrier cart. Therefore, the conveyor carrier cart may be easily removed from the conveyor assembly without the need of additional tools or incurring additional cost and time during maintenance of the conveyor assembly.

In the following detailed description, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various elements are described which may be present for some embodiments but not for other embodiments.

It is understood that the use of specific component, device, and/or parameter names and/or corresponding acronyms thereof, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features, or concepts of the embodiments are provided solely as examples of one implementation, and such references do not limit the extension of the claimed embodiments to embodiments in which a different element, feature, protocol, or concept name is utilized. Thus, each term utilized herein is to be given its broadest interpretation given the context in which that terms is utilized. By way of example, description herein is made with reference to conveyor systems in general; however, various elements of the present disclosure may also relate to sorter and/or loop sorter systems.

With reference to FIG. 1, a perspective view of a material handling system 100, in accordance with one or more embodiments of the present disclosure is illustrated. The material handling system 100 may include a conveyor 102 (e.g., sorter, loop sorter, etc.). The conveyor 102 may include a conveyor bed 104 (e.g., sorter track, sorter frame, or the like) and one or more conveyor carrier carts 106. In some embodiments, the material handling system 100 includes an induction station 108 positioned adjacent to the conveyor 102 at one end. The material handling system 100 may further include discharge chutes 110 positioned at an opposing end of the conveyor 102 downstream of the induction station 108.

Examples of the conveyor 102 may include, but are not limited to, a sortation conveyor. According to one or more other embodiments, the conveyor 102 may be any of a cross belt loop sorter, a tilt tray sorter, pusher type sorter, or the like. The conveyor 102 is configured to transfer a load 112 (e.g., an object disposed thereon) from one location to another location. The conveyor bed 104 may be adapted to movably support the one or more conveyor carrier carts, one of which is shown at 106, on which one or more carriers 114 are supported. In an example embodiment, the one or more carriers 114 are adapted to support the load 112 (e.g., articles, packages, cartons, objects, or the like). In an example embodiment, the one or more conveyor carrier carts may be installed on the conveyor bed 104 along a length of the conveyor 102. The one or more conveyor carrier carts may be endlessly conveyed on the conveyor bed 104 in a looping direction indicated by arrows 115. For example, the one or more conveyor carrier carts, carrying the load 112 inducted from the induction station 108, may deliver the load 112 at the discharge chutes 110, and, upon delivering the load 112, the one or more conveyor carrier carts may return to the induction station 108 tracing a closed loop path in the looping direction indicated by the arrows 115. In this manner, the one or more conveyor carrier carts are endlessly conveyed on the conveyor bed 104 to receive the load 112 and deliver the load 112 to appropriate discharge chutes 110. The general structure of an exemplary carrier cart 106 from among the one or more conveyor carrier carts has been shown in the breakout view in FIG. 1. The detailed construction of the exemplary carrier cart (e.g., carrier cart 106 as shown in FIG. 1) will be further described in conjunction with FIG. 2.

Figure 2:
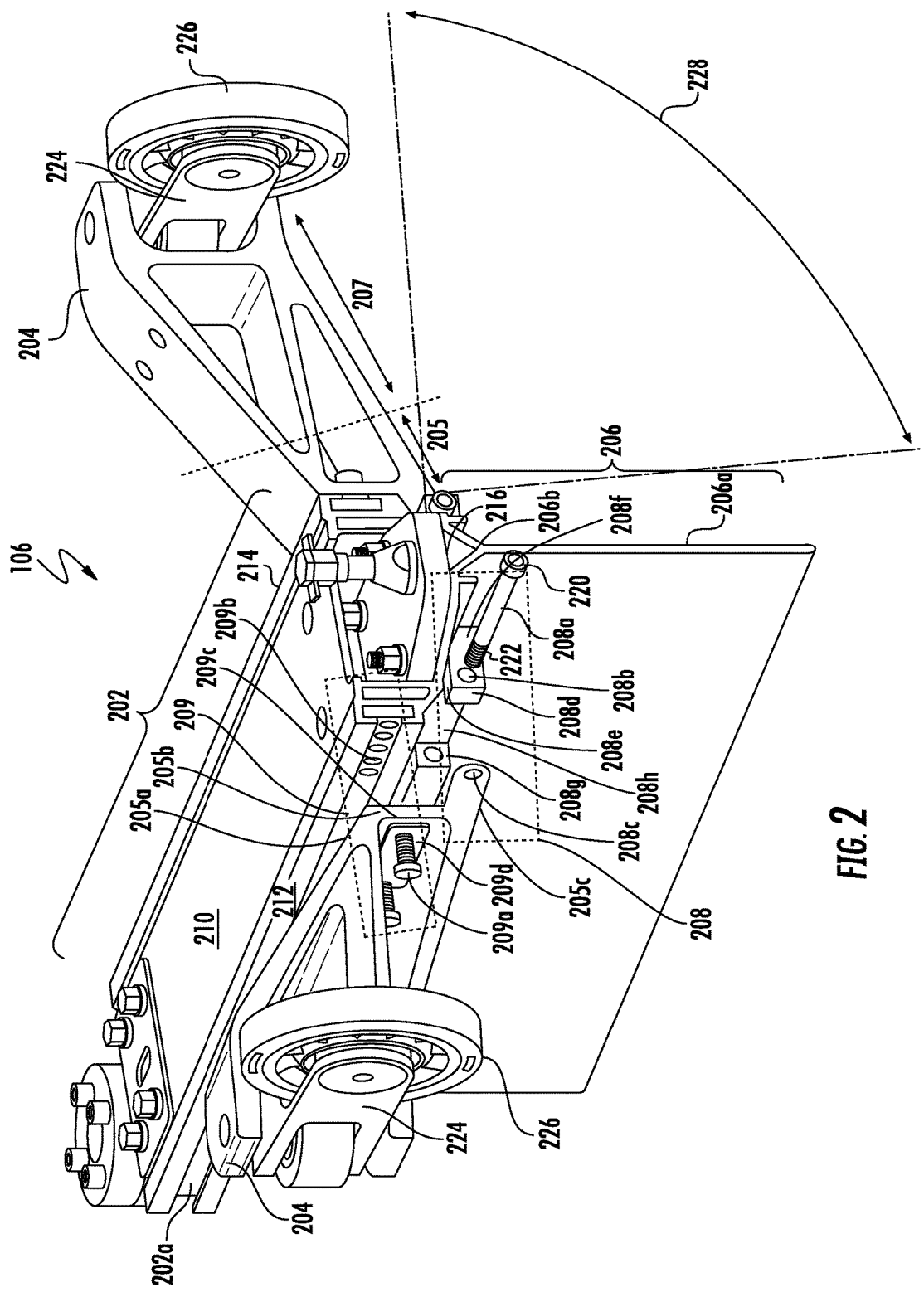
FIG. 2 illustrates a perspective view of a conveyor carrier cart of FIG. 1, in accordance with one or more embodiments of the present disclosure.

FIG. 2 illustrates a perspective view of a conveyor carrier cart 106 of FIG. 1, in accordance with an example embodiment of the present disclosure. The conveyor carrier cart 106 includes a main frame 202, a pair of pivoting arms 204, a conductor plate 206, a folding mechanism 208, and a locking mechanism 209.

The main frame 202 defines a load carrying surface configured to support one or more objects disposed thereon. The main frame 202 may include a first surface 210, a second surface 212, a third surface 214 (not shown), and a fourth surface 216 (not shown). The second surface 212 and the third surface 214 may be lateral with respect to the first surface 210. Further, the fourth surface 216 may be located substantially perpendicular with respect to the second surface 212 and the third surface 214. Still further, the fourth surface 216 may be parallel to the first surface 210. The first surface 210 may form a top surface of the conveyor carrier cart 106, and the fourth surface 216 may form a bottom surface of the conveyor carrier cart 106, where the bottom surface is opposite the load carrying surface (e.g., the first surface 210). The second surface 212 and the third surface 214 (not shown) may form a left and a right-side surfaces of the conveyor carrier cart 106, respectively, and when viewed from the front of the conveyor carrier cart 106. In some embodiments, the left and the right-side surfaces of the conveyor carrier cart 106 may be mirror images of one another (e.g., mirrored about the main frame 202). The second surface 212 and the third surface 214 (not shown) may further include a T-shaped recess 202a extending along the length of the second surface 212 and the third surface 214 (not shown) of the main frame 202.

With continued reference to FIG. 2, the conductor plate 206 may include a plate section 206a and a bracket section 206b. The bracket section 206b and the plate section 206a may, for example, be dimensioned (e.g., sized and shaped) to have a Y-shaped cross section. The bracket section 206b may form an upper section of the conductor plate 206. In some embodiments, the bracket section 206b may, for example, define a V-shaped cross-section extending the length of the fourth surface 216 of the main frame 202. The plate section 206a forming the bottom part of the conductor plate 206 may include, for example, a downwardly extending rigid plate section of T or I-beam shape that extends the length of the bracket section 206b.

According to an example embodiment, as shown in FIG. 2, the folding mechanism 208 and the locking mechanism 209 that facilitates transformation of the conveyor carrier cart 106 may be partially installed on the main frame 202 and partially installed on each of the pivoting arms 204. For example, the folding mechanism 208 may include a pivot pin 208a, a set of apertures 208b, 208c and a hinge block 208d. The pivot pin 208a and the hinge block 208d may be installed at opposite ends of the fourth surface 216 of the main frame 202 proximal to the bracket section 206b of the conductor plate 206. The set of apertures 208b, 208c may be provided on each of the pivoting arms 204 and the hinge block 208d, respectively. The set of apertures 208b, 208c in combination with the pivot pin 208a and the hinge block 208d facilitate pivotal movement of each of the pivoting arms 204 between a deployed position and a retracted position. For example, in the deployed position, distal end of each of the pivoting arms 204 are spread outwardly away from the main frame 202 and remain substantially parallel with the main frame. In the retracted position, the distal end of each of the pivoting arms 204 are folded towards the main frame 202 and remain substantially perpendicular with respect to the main frame 202. In an example embodiment, the deployed position corresponds to a position at which the conveyor carrier cart 106 is installed on the conveyor bed 104 and the retracted position corresponds to a position at which the conveyor carrier cart 106 is fully removed from the conveyor bed 104 (e.g., has no contact with the conveyor bed 104). For example, in the retracted position, each pivoting arm 204 may be disposed adjacent a bottom surface 216 of the main frame 202. In this way, components such as the pivot pin 208a, the set of apertures 208b, 208c, and the hinge block 208d together form the folding mechanism 208 that is partially installed on the main frame 202 and partially installed on each of the pivoting arms 204 so as to transform the conveyor carrier cart 106 between the deployed position and the retracted position.

According to an example embodiment, as shown in FIG. 2, the locking mechanism 209 that facilitates transformation of the conveyor carrier cart 106 to the deployed position may be partially installed on the main frame 202 and partially installed on each of the pivoting arms 204. For example, the locking mechanism 209 may include attaching bolts 209a, a set of apertures 209b, 209c, and washer plates 209d. The set of apertures 209b, 209c are provided at one end of the left and right-side surfaces of the second surface 212 and the third surface 214 (not shown) respectively. The set of apertures 209b, 209c may be located proximal to the pivot pin 208a and the hinge block 208d of the folding mechanism 208. For example, the set of apertures 209b, 209c may be provided above the hinge block 208d on the second surface 212 and the third surface 214. On the other hand, the attaching bolts 209a and the washer plates 209d are provided on each of the pivoting arms 204. The set of apertures 209b, 209c in combination with the attaching bolts 209a and the washer plates 209d may facilitate locking of each of the pivoting arms 204 in the deployed position. As described above, the deployed position corresponds to a position at which the conveyor carrier cart 106 is installed on the conveyor bed 104 with each of the pivoting arms 204 spread outwardly away from the main frame 202 and engaged with the locking mechanism 209 to lock each of the pivoting arms 204 in the deployed position. Therefore, components such as the attaching bolts 209a, the set of apertures 209b, 209c, and the washer plates 209d together form the locking mechanism 209 that is partially installed on the main frame 202 and partially installed on each of the pivoting arms 204 to transform the conveyor carrier cart 106 and lock it in the deployed position.

With continued reference to FIG. 2, the hinge block 208d may be positioned on the fourth surface 216 (not shown) of the main frame 202. The hinge block 208d may include a protruding portion 208e that may extend outwardly from the fourth surface 216 of the main frame 202 and perpendicular to the conductor plate 206. For example, the protruding portion 208e may be partially attached to the fourth surface 216 of the main frame 202 and partially extend out of the fourth surface 216 in a direction away from the fourth surface 216. The protruding portion 208e of the hinge block 208d may include a first set of apertures 208b. The first set of apertures 208b may be provided on an outer face 208f and an inner face 208g of the protruding portion 208e. The outer face 208f of the hinge block 208d may be a portion of the hinge block 208d receiving a head portion 220 of the pivot pin 208b. The inner face 208g of the hinge block 208d may be a portion of the hinge block 208d receiving a tail portion 222 of the pivot pin 208a. According to an example embodiment, the tail portion 222 of the pivot pin 208a may be threaded to facilitate a threaded engagement of the pivot pin 208a on the inner face 208g of the hinge block 208d. Further, the hinge block 208d may include a gap 208h positioned in between the outer face 208f and inner face 208g of the protruding portions 208d of the hinge block 208c. In the example embodiment, the pivot pin 208b may be rotatably received within the first set of apertures 208b. The pivot pin 208a may be inserted through the first set of apertures 208b. For example, the pivot pin 208a may pass through the outer face 208f and may extend beyond the outer face 208f and engage with the inner face 208g through the first set of apertures 208b. In some embodiments, the pivot pin 208b extends along the length of the gap 208h provided between the outer face 208f and the inner face 208g.

Referring to FIG. 2, the locking mechanism 209 may include attaching bolts 209a, second set of apertures 209b, and washer plates 209d. In such an example embodiment, the second set of apertures 209b may be provided in the T-shaped recess 202a extending along the length of the second surface 212 and the third surface 214 of the main frame 202. The second set of apertures 209b may receive the attaching bolts 209a. For example, the second set of apertures 209b may be threaded apertures that hold a threaded tail portion of the attaching bolts 209c in a threaded engagement.

Each of the pivoting arms 204 may be coupled to the second surface 212 and the third surface 214, respectively, via the locking mechanism 209 and the fourth surface 216 of the main frame 202 via the folding mechanism 208. As illustrated in FIG. 2, each of the pivoting arms 204 may include a first end 205 and a second end 207. The first end 205 of each of the pivoting arms 204 is detachably coupled to the fourth surface 216 of the main frame 202 by means of pivot pin 208a as described below. The first end 205 of each of the pivoting arms 204 is detachably coupled to the second surface 212 and the third surface 214, respectively, by means of attaching blots 209a and washer plates 208d as described below. The first end 205 may be a proximal end of each of the pivoting arms and the second end 207 may be a distal end of each of the pivoting arms. For example, the proximal end may be configured to connect pivoting arms 204 with the main fame 202 and the distal end is configured to engage a corresponding guide member of the conveyor assembly.

Further, the first end 205 of each of the pivoting arms 204 may include a pair of top edge portions 205a, a central portion 205b, and a pair of bottom edge portions 205c. Each of the bottom edge portions 205c of each of the pivoting arms 204 may include a third set of apertures 208c. Each of the bottom edge portions 205c may be coupled to the fourth surface 214 of the main frame 202 via the third set of apertures 208c and the pivot pin 208b. For example, the third set of apertures 208c provided on each of the bottom edge portion 205c may be inserted into the gap 208h provided in the hinge block 208c to attached (e.g., engage, secure, etc.) each of the pivoting arms 204 to the main frame 202. After the bottom edge portion 205c is inserted into the gap 208h, the third set of apertures 208c may receive the pivot pin 208b. Thus, the bottom edge portions 205c of each of the pair of pivoting arms 204 is coupled to the main frame 202 using the pivot pin 208a, hinge block 208d, and the third set of apertures 208c to allow radial rotation of each of the pivoting arms 204 with respect to the main frame 202.

The pair of top edge portions 205a and the central portion 205b of each of the pivoting arms 204 may be coupled to the second surface 212 and the third surface 214 of the main frame 202, respectively. The central portion 205b may include a fourth set of apertures 209c configured to receive the attaching bolts 209a and the washer plates 209d. For example, the central portion 205b and top edge portion 205a of each of the pivoting arms 204 may be coupled to the main frame 202 using the attaching bolts 209a inserted through corresponding holes provided in the washer plates 209d. Thus, the pair of top edge portions 205a and the central portion 205b are coupled to the main frame 202 using attaching bolts 209c and the washer plates 209d to allow locking of each of the pivoting arms 204 with respect to the main frame 202.

In some embodiments, the second end 207 may correspond to the distal end of each of the pivoting arms 204 and may be pivotally connected to wheel support arms 224 that in turn rotatably support one or more rotatable guide wheels 226. The one or more rotatable guide wheels 226 facilitate the movement of the conveyor carrier cart 106 along the corresponding guide members, for example, guide rails 301 (as shown in FIG. 3) provided on the conveyor bed 104 (as shown in FIG. 1).

The folding mechanism 208 that includes the pivot pin 208a, hinge block 208d, and the set of apertures 208b, 208c facilitates a pivotal movement of each of the pivoting arms 204. The locking mechanism 209 that includes the attaching bolts 209a with washer plate 209d, the fourth set of apertures 209c, and the recess 202a, including the second set of apertures 209b, facilitates locking of the pivotal movement of the pair of pivoting arms 204. The folding mechanism 208 is configured to pivotally connect the proximal end of each pivoting arm 204 to the main frame 202 and is configured to pivot each of the pivoting arms 204 between a deployed position and a retracted position. For example, in the retracted position, the distal end of each pivoting arm 204 may pivot about the folding mechanism 208 to disengage from the corresponding guide members of the conveyor assembly such that the conveyor carrier cart 106 is removable from the conveyor assembly. The locking mechanism 209 may be configured to secure each of the pivoting arms 204 in the deployed position. In the deployed position, the distal end of each pivoting arm 204 is configured to engage the corresponding guide members of the conveyor assembly such that the conveyor carrier cart 106 is movable along the conveyor assembly.

In an example embodiment, at any time when the carrier cart 106 is to be removed from the conveyor bed 104 (as shown in FIG. 1), the attaching bolts 209c of locking mechanism 209 may be removed to permit each of the pivoting arms 204 to be pivoted downwardly and inwardly about the pivot pin 208a in the direction of arrows 228 defining the folding pivot axis. The pivot pin 208a rotates each pivoting arm 204 in an inward direction until each of the pivoting arms 204 are located substantially parallel with respect to one another. For example, each pivoting arm 204 undergoes a radial rotation from an initial position 'x' to a final position 'y'. The initial position 'x' corresponds to the deployed position and the final position 'y' corresponds to the retracted position. Therefore, each of the pivoting arms 204 traces a closed path in an inward direction defined by the initial position 'x' and the final position 'y'. In this regard, the pivot pin 208a is operable to fold each of the pivoting arms 204 about the folding pivot axis in the closed loop path defined by the x-y positions below the main frame 202 of the conveyor carrier cart 106.

Figure 3:
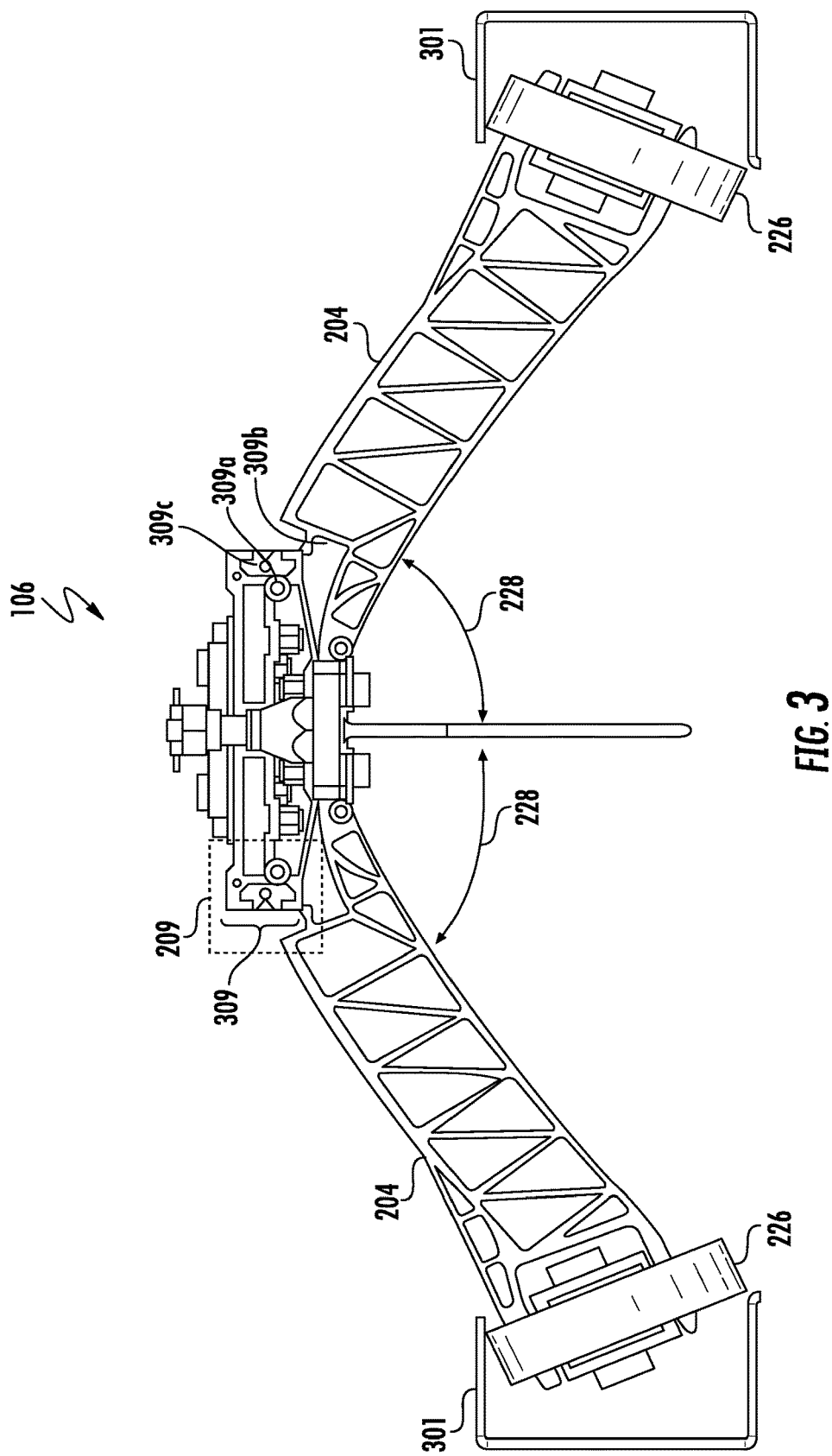
FIG. 3 illustrates a front view of the conveyor carrier cart pivoting between a deployed position and a retracted position, in accordance with one or more embodiments of the present disclosure.

In an example embodiment, when the conveyor carrier cart 106 is placed on the conveyor bed 104, each of the pivoting arms 204 are raised in the direction of arrows 228 defining the folding pivot axis away from the main frame 202 to a deployed position and the conveyor carrier cart 106 is positioned such that the one or more rotatable guide wheels 218 fit within the associated guide rails 301 on conveyor bed 104, as shown in the partially deployed configuration in FIG. 3. According to an example embodiment, in an instance in which each of the pivoting arms 204 are raised in the direction of arrows 228 to the deployed position, (e.g., tracing the closed path from the 'y' position to the 'x' position), the attaching bolts 209c of locking mechanism 209 are re-inserted such that each of the pivoting arms 204 may be locked in the deployed position.

According to another example embodiment, in an instance in which the conveyor carrier cart 106 is pressed downwardly (e.g., receives a force substantially perpendicular with respect to the load carrying surface) or settles downwardly under its own weight (e.g., a resting position), the locking mechanism 209 provided on each of the pivoting arms 204 may move into alignment with one or more apertures provided on the T-shaped recess 202a such that the attaching bolts by 209c can be threadedly inserted through washer plate 209d and then into the corresponding apertures. The attaching bolts 209c may then be tightened to lock each of the pivoting arms 204 into their deployed positions.

FIG. 3 illustrates a front view of the conveyor carrier cart pivoting between a deployed position and a retracted position, in accordance with one or more embodiments of the present disclosure. The conveyor carrier cart 106 may include a locking mechanism 209, such as a snap fit lock 309 and a push button. The snap fit lock 309 may include an elongated male member 309b having a generally circular cross section attached to an inner surface of each of trussed struts forming pivoting arms 204 by a short elongated offset strip. The elongated male member 309b may be formed on each of the pivoting arms 204 or as a separate part attached to each of the pivoting arm 204. The snap fit lock 309 may also include a pair of generally parallel elongated female locking members 309c attached on the ends of the second surface 212 and the third surface 214 of the main frame 202 nearest to the folding mechanism 208. Each of the female locking members 309c may define an inner surface configured such that when these members are in the closed, abutting position they form an elongated slot having a profile of the elongated male member 309b. The female locking members 309c may be urged toward each other by springs or other biasing means or may be formed in whole or in part of an elastomeric-type material.

Accordingly, when each of the pivoting arms 204 are in the folded position or retracted position, male elongated members 309b are disengaged from the elongated slot formed between female locking members 309c. However, when the pivoting arms 204 are lowered to the deployed position, the male members 309b are forced into the slot formed between the female locking members 309c that separate to allow entry of the elongated male members 309b. Once each of the elongated male members 309b is fully engaged with the cooperating slot, the biasing force urging the female locking members together is sufficient to lock the elongated male members 309b in place through a snap fit and prevent the elongated male members 309b from becoming disengaged from the female locking members 309c. In this way, each of the pivoting arms 204 may be securely locked in their deployed position.

In some embodiments, the conveyor carrier cart 106 may include more than one pair of pivoting arms 204. By way of example, in some embodiments, each conveyor carrier cart 106 on the conveyor bed 104 may include two pairs of pivoting arms 204 attached to the main frame 202 of the conveyor carrier cart 106. According to an embodiment, two pairs of pivoting arms 204 may also be attached on the main frame 202 conveyor carrier cart 106. According to an embodiment, a first pair of pivoting arms 204 and a second pair of pivoting arms (not shown) may include pivot pins 208a that form the folding mechanism 208 for each of the first pivoting arms 204 and the second pivoting arms (not shown). Further, the first pair of pivoting arms 204 may include snap fit lock 309 that forms the locking mechanism 209 and the second pair of pivoting arms (not shown) may include attachment bolts 209a and washer plates 209d that form the locking mechanism 209. In this regard, the first pair of pivoting arms 204 may operate using the snap fit lock 309 and the second pair of pivoting arms (not shown) may operate using the attachment bolts 209a and washer plates 209d.

Figure 4:
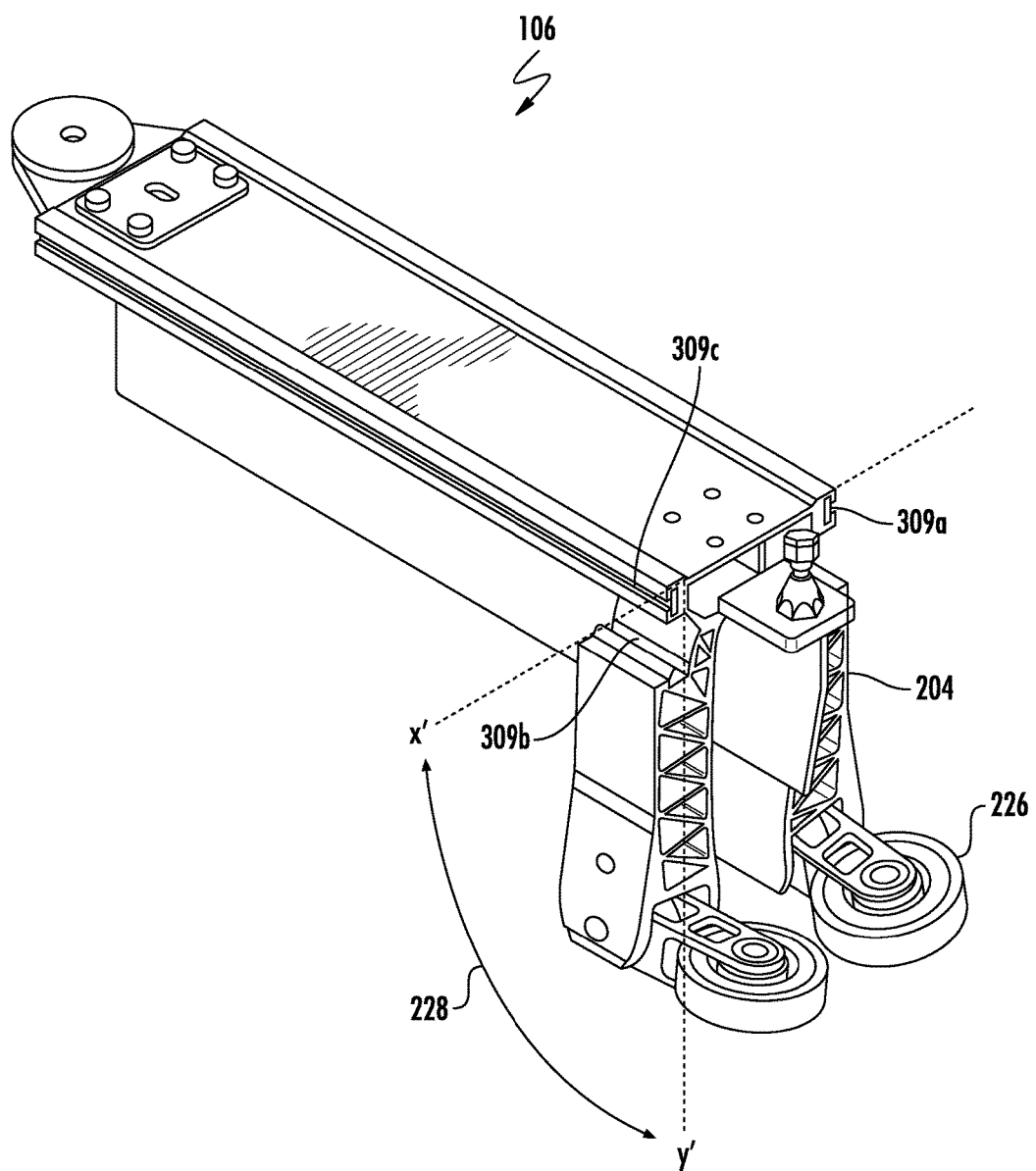
FIG. 4 illustrates a perspective view of the conveyor carrier cart in a retracted position, in accordance with one or more embodiments of the present disclosure.

With reference to FIG. 4, a perspective view of the conveyor carrier cart in a retracted position, in accordance with one or more embodiments of the present disclosure, is illustrated. The conveyor carrier cart 106 is provided with a push button (as shown in FIG. 3). To facilitate release of each of the pivoting arms 204 to their retracted positions, the push button may be operated to selectively release the snap fit lock 309. The push button may, for example, be any type of conventional spring-loaded push button or the like, that when depressed, rotated, or otherwise actuated will enable elongated male member 309b to withdraw or to be forced from between female locking members 309c, thereby permitting each of the pivoting arms 204 to pivot downwardly to a folded position. In one embodiment, by way example, this may be accomplished by spreading female locking members 309c apart a sufficient distance to permit elongated male member 309b to move out from entrapment between the female locking members 309c and pivot into the folded position. The snap fit lock 309 may, in some embodiments, further include a retention screw 309a that operates to secure the female locking member 309c.

As described above, conventional conveyor systems utilize rigid load supporting arms that are often fixedly connected on top of a conveyor frame. Accordingly, when these conventional carts support a load (e.g., items, packages, etc.), the weight of the load is often concentrated to a greater extent on the rigid support arms than any main body of the carrier cart. In this regard, when a towing force is applied to these conventional carts, the towing force is exerted to a greater extent on the rigid support arms such that these rigid elements support the majority of the weight of the load. In this way, the rigid support arms are susceptible to damage and increased the wear and tear resulting in frequent maintenance.

As illustrated by the description of the conveyor carrier carts 106 presented herein, when the conveyor carrier cart 106 is in the deployed position (e.g., in operation on the conveyor bed 104), the conveyor carrier cart 106 may be configured such that the strength requirement of each of the pivoting arms 204 in the vertical direction is maintained. Said differently, each of the pivoting arms 204 may be positioned on a bottom surface of the main frame 202 of the conveyor carrier cart 106 both in the deployed position and the retracted position. In this way, the weight of the load received by the carrier cart 106 as claimed may be concentrated to a greater extent on the main frame 202 as opposed to the pivoting arms 204. In the deployed position, the pivoting arms 204 are positioned under the main frame, such that the top surface of the main frame 202 is exposed to the load and the force (e.g., weight) of the load is concentrated on the top surface of the main frame 202 (e.g., a minimal impact on the pivoting arms 204 positioned below the main frame 202). Additionally, in an instance in which a tow force is exerted on the conveyor carrier cart 106 for movement along the conveyor bed 104, the force is transmitted directly through the main frame 202 of the conveyor carrier cart 106, and therefore, the force has a minimal impact on the pivoting arms 204 (e.g., given that the pivoting arms 204 are hinged from the bottom of the conveyor carrier cart 106). Accordingly, the main frame 202 of the conveyor carrier cart 106 acts as a keystone to carry the load more efficiently than conventional systems.

Furthermore, the pivoting arms of the present application as described above provide mechanisms for folding and unfolding of each of the pivoting arms and for automatically locking each of the pivoting arms in their deployed position such that the need of additional tools that might otherwise be required for installing and removing the conveyor carrier carts from a conveyor bed are unnecessary. Furthermore, by allowing each pivoting arm of the conveyor carrier cart to pivot between the deployed position and the retracted position, replacement, repair, storage, and shipment of the conveyor carrier cart is greatly improved and shipping costs and storage space are reduced.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. For example, the construction of the folding mechanism may be reversed or otherwise modified, so that the pivoting arms pivot upwardly from the deployed operational position. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In addition, it should be understood that the figures, which highlight the structure, methodology, functionality and advantages of the present disclosure, are presented as examples only. The present disclosure is sufficiently flexible and configurable, such that it may be implemented in ways other than that shown in the accompanying figures.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements are equally contemplated by the present disclosure.

The invention claimed is:

1. A conveyor carrier cart comprising:
   a main frame, wherein the main frame defines a load carrying surface configured to support one or more objects disposed thereon;
   a pair of pivoting arms, wherein each pivoting arm defines:
      a proximal end configured to connect the pivoting arm with the main frame, and
      a distal end configured to engage a corresponding guide member of a conveyor assembly, and
   a folding mechanism comprising a first set of apertures, in combination with a pivot pin and a hinge block and configured to pivotally connect the proximal end of each pivoting arm to the main frame,
   wherein each pivoting arm is configured to pivot about the folding mechanism between a deployed position and a retracted position,
   wherein in the deployed position, the distal end of each pivoting arm is configured to engage a corresponding guide member of the conveyor assembly such that the conveyor carrier cart is movable along the conveyor assembly,
   wherein in the retracted position, the distal end of each pivoting arm pivots about the folding mechanism to disengage from the corresponding guide member of the conveyor assembly such that the conveyor carrier cart is removable from the conveyor assembly.

2. The conveyor carrier cart as claimed in claim 1, further comprising a locking mechanism comprising a second pair of apertures, in combination with an attaching bolt and a washer plate configured to secure each pivoting arm in the deployed position.

3. The conveyor carrier cart as claimed in claim 2, wherein the locking mechanism further comprises snap fit locks.

4. The conveyor carrier cart as claimed in claim 2, wherein removal of the attaching bolt from the locking mechanism permits each of the pair of pivoting arms to be pivoted downwardly and inwardly about the pivot pin in a direction of a folding pivot axis.

5. The conveyor carrier cart as claimed in claim 1, wherein each pivoting arm, when in the retracted position, is disposed adjacent a bottom surface of the main frame, wherein the bottom surface is opposite the load carrying surface.

6. The conveyor carrier cart as claimed in claim 1, further comprising one or more rotatable guide wheels located at the distal end of each pivoting arm.

7. The conveyor carrier cart as claimed in claim 1, wherein the main frame further comprises:
   a first surface, wherein the first surface corresponds to the load carrying surface;
   a second surface;
   a third surface opposite the second surface; and
   a fourth surface, wherein the fourth surface corresponds to a bottom surface opposite the first surface.

8. The conveyor carrier cart as claimed in claim 7, wherein each of the pivoting arms is coupled to the fourth surface via the folding mechanism and at least one of the pivoting arms is coupled to the second surface and at least one of the pivoting arms is coupled the third surface via the locking mechanism.

9. The conveyor carrier cart as claimed in claim 1, wherein the folding mechanism is configured to radially rotate each pivoting arm between an initial position 'x' and a final position 'y', wherein the final 'y' position corresponds to an instance in which each of the pivoting arms are located substantially parallel with respect to one another.

10. The conveyor carrier cart as claimed in claim 9, wherein the folding mechanism is configured to radially rotate each of the pivoting arms about a folding pivot axis defined by the pivot pin in the closed loop path between the 'x' and 'y' positions, wherein the radial rotation is located substantially below the main frame of the conveyor carrier cart.

11. The conveyor carrier cart as claimed in claim 1, wherein in the deployed position, each of the pivoting arms are located substantially parallel with respect to the load carrying surface of the main frame, and wherein in the retracted position, each of the pivoting arms are located substantially perpendicular with respect to the load carrying surface of the main frame.

12. The material handling system as claimed in claim 11, wherein each pivoting arm, when in the retracted position, is disposed adjacent a bottom surface of the main frame, wherein the bottom surface is opposite the load carrying surface.

13. The conveyor carrier cart as claimed in claim 1, further comprising a conductor plate defined by a plate section and a bracket section, wherein the conductor plate comprises a Y-shaped cross section.

14. The conveyor carrier cart as claimed in claim 1, further comprising:
  a second pair of pivoting arms, wherein each of the second pair of pivoting arms defines:
    a proximal end configured to connect each of the second pair of pivoting arms with the main frame, and
    a distal end configured to engage the corresponding guide member of the conveyor assembly; and
  a second folding mechanism configured to pivotally connect the proximal end of each of the second pair of pivoting arms to the main frame,
  wherein each of the second pair of pivoting arms is configured to pivot about the second folding mechanism between a deployed position and a retracted position,
  wherein in the deployed position, the distal end of each of the second pair of pivoting arms is configured to engage the corresponding guide member of the conveyor assembly such that the conveyor carrier cart is movable along the conveyor assembly,
  wherein in the retracted position, the distal end of each of the second pair of pivoting arms pivots about the second folding mechanism to disengage from the corresponding guide member of the conveyor assembly such that the conveyor carrier cart is removable from the conveyor assembly.

15. The conveyor carrier cart as claimed in claim 14, further comprising a push button configured to selectively release each of the second pair of pivoting arms such that each of the second pair of pivoting arms is rotated to the retracted position.

16. A material handling system comprising:
  a conveyor assembly comprising:
    a conveyor bed configured to moveably support one or more conveyor carrier carts, and
    one or more corresponding guide members; and
  one or more conveyor carrier carts, wherein each conveyor carrier cart comprises:
    a main frame, wherein the main frame defines a load carrying surface configured to support one or more objects disposed thereon;
  a pair of pivoting arms, wherein each pivoting arm defines:
    a proximal end configured to connect the pivoting arm with the main frame, and
    a distal end configured to engage the corresponding guide member of the conveyor assembly; and
    a folding mechanism comprising a first set of apertures, in combination with a pivot pin and a hinge block, and configured to pivotally connect the proximal end of each pivoting arm to the main frame,
  wherein each pivoting arm is configured to pivot about the folding mechanism between a deployed position and a retracted position,
  wherein in the deployed position, the distal end of each pivoting arm is configured to engage a corresponding guide member of the conveyor assembly such that the conveyor carrier cart is movable along the conveyor assembly,
  wherein in the retracted position, the distal end of each pivoting arm pivot about the folding mechanism to disengage from the corresponding guide member of the conveyor assembly such that the conveyor carrier cart is removable from the conveyor assembly.

17. The material handling system as claimed in claim 16, wherein the distal end of each pivoting arm comprises one or more rotatable guide wheels.

18. The material handling system as claimed in claim 16, further comprising a locking mechanism comprising a second pair of apertures, in combination with an attaching bolt and a washer plate and configured to secure each pivoting arm in the deployed position.

19. The material handling system as claimed in claim 18, wherein removal of the attaching bolt from the locking mechanism permits each of the pair of pivoting arms to be pivoted downwardly and inwardly about the pivot pin in a direction of a folding pivot axis.

20. The material handling system as claimed in claim 16, wherein in an operational configuration in which the load carrying surface supports one or more packages, the weight of the one or more packages is imparted as a compression force equally divided between each of the pivoting arms.

* * * * *